United States Patent [19]

Morris

[11] 4,281,676
[45] Aug. 4, 1981

[54] PRESSURE MODULATING SELECTOR VALVE

[75] Inventor: Hugh C. Morris, Morton, Ill.

[73] Assignee: Caterpillar Tractor Co., Peoria, Ill.

[21] Appl. No.: 884,675

[22] Filed: Mar. 8, 1978

[51] Int. Cl.³ .......................................... F16K 31/143
[52] U.S. Cl. ................. 137/102; 137/625.6; 91/469; 192/87.13
[58] Field of Search ...................... 137/102, 495, 625.6, 137/625.66, 86; 74/364; 91/468, 469; 192/87.13, 87.18; 251/63.4

[56] References Cited

U.S. PATENT DOCUMENTS

| 3,114,387 | 12/1963 | Barkan et al. ................... 251/63.4 |
| 3,389,770 | 6/1968 | Golan et al. ...................... 192/87.13 |
| 3,468,194 | 9/1969 | Horsch et al. ................ 192/87.13 X |
| 3,820,417 | 6/1974 | Allen ........................... 192/87.13 X |
| 3,882,738 | 5/1975 | Aodiffred, Jr. et al. ..... 192/87.13 X |
| 3,923,076 | 12/1975 | Blake .................................. 137/495 |
| 3,960,172 | 6/1976 | Blake . |
| 4,093,048 | 6/1978 | Hakes et al. ................. 192/87.13 X |

Primary Examiner—William R. Cline
Attorney, Agent, or Firm—Phillips, Moore, Weissenberger, Lempio & Majestic

[57] ABSTRACT

A selector valve selectively communicates pressurized fluid from an inlet to an outlet and is adapted to be connected to a clutch of a transmission. The selector valve comprises a spool normally blocking communication between the inlet and outlet, a selector piston responsive to a control signal for movement towards the spool and a load piston reciprocally mounted in the selector piston and adapted to be moved thereby to control movements of the spool. A modulating orifice is interconnected between the outlet and the load piston to control movements of the spool for modulating fluid pressure in the outlet to a predetermined level.

16 Claims, 13 Drawing Figures

PRESSURE MODULATING SELECTOR VALVE

BACKGROUND OF THE INVENTION

This invention relates to an improved pressure modulating selector valve of the type particularly adapted for use in a control circuit for hydraulically actuating clutches of a transmission.

Clutches of this type require control modulation to provide for the gradual engagement thereof, maintenance of a top actuating pressure and controlled modulation during disengagement of the clutch. Conventional pressure modulating relief and reducing valves do not always provide for the close control of such clutch operating functions and are oftentimes unduly complex.

SUMMARY OF THE INVENTION

An object of this invention is to overcome one or more of the above problems by providing an improved pressure modulating selector valve for closely modulating fluid pressure therethrough. The valve comprises first means normally blocking communication of the fluid from an inlet to an outlet of the valve and second means responsive to a control signal for movement toward the first means. Third means, responsive to movement of the second means, functions to move the second means to communicate the inlet with the outlet to permit controlled communication of fluid therebetween. Modulating means, interconnected between the outlet and the third means, controls movement of the first means to modulate fluid pressure in the outlet to a predetermined level.

BRIEF DESCRIPTION OF THE DRAWING

Other objects of this invention will become apparent from the following description and accompanying drawing wherein.

DETAILED DESCRIPTION OF THE PREFERRED EMBODIMENT

Figure 1:
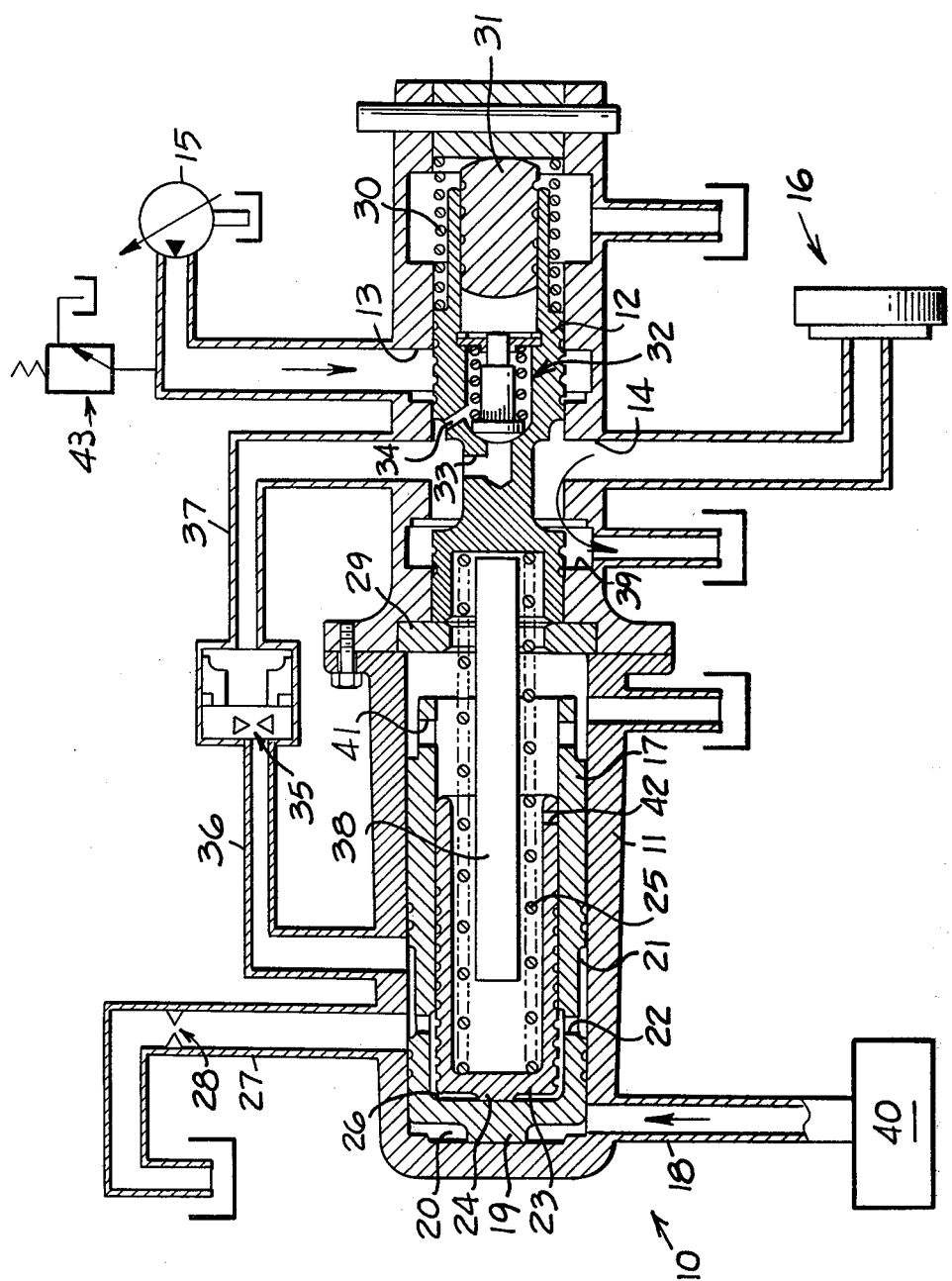
FIG. 1 is a longitudinal sectional view of a pressure modulating selector valve embodying this invention and incorporated into a hydraulic circuit for actuating a clutch.

FIG. 1 illustrates a pressure modulating selector valve 10 comprising a housing 11, having a modulating spool or first means 12 reciprocally mounted therein. The spool is shown in its closed position whereby the communication of pressurized fluid from an inlet 13 to an outlet 14 of the valve is prevented. The inlet communicates with a pressurized fluid source, including a pump 15, whereas the outlet communicates with a hydraulically actuated clutch 16 employed in a conventional transmission. It should be understood that although the pressure modulating selector valve of this invention finds particular application in a control circuit for such a clutch, that the valve has other applications which are well recognized to those skilled in the arts relating hereto.

The valve further comprises a selector piston or second means 17 reciprocally mounted in housing 11 and responsive to a fluid pressure pilot signal in a conduit 18 for movement towards spool 12. An annular boss 19 forms a first stop means on the end of the piston to engage the housing when the piston reaches its extreme leftward position in the housing and to define an actuating chamber 20 for receiving the fluid pressure pilot signal from conduit 18. An annular groove 21 is formed on the periphery of the piston to communicate with the plurality of radially disposed ports 22 formed through the piston for purposes hereinafter explained.

A load piston 23 comprises third means responsive to rightward movement of piston 17 for moving spool 12 rightwardly to communicate inlet 13 with outlet 14. Piston 23 has an annular boss 24 formed thereon to provide second stop means normally abutting piston 17 when selector valve 10 is maintained in its disengaged illustrated position. Biasing means in the form of a compression coil spring 25 is disposed between piston 23 and spool 12 to provide modulating biasing means for aiding in the modulation of hydraulic fluid from the inlet to the outlet.

A control chamber 26 is thus defined between pistons 17 and 23 and communicates with a drain conduit 27, via ports 22 and groove 21, when clutch 16 is disengaged. An orifice means 28 is mounted in conduit 27 to aid in modulating fluid flow upon disengagement of clutch 16, as will be hereinafter more fully explained.

In its disengaged condition of operation, the leftward end of spool 12 engages an annular collar 29, secured to housing 11, which forms a third stop means in the selector valve for maintaining the spool in its disengaged position. The latter stop means also functions to limit rightward movement of piston 17 and thus provides a common stop means between the spool and piston. The spool is biased leftwardly towards its disengaged position by a coil spring 30 which provides positioning means to achieve this function.

A cylinder slug 31 is reciprocally mounted in the rightward end of the spool to function in a conventional manner.

System fluid pressures and pulsations are dampened in a conventional manner by a standard spring-biased poppet valve means 32, mounted in spool 12. It should be noted that a port 33 and orifice 34 are formed through a side wall of the spool to communicate such system fluid pressures to the poppet valve. It should be noted that fluid trapped behind the poppet valve will pass over slug 31 for passage into the illustrated drain outlet.

A second orifice means 35 is interconnected between outlet 14 and load piston 23 to provide modulating means for controlling movement of the load piston and thus modulating spool 12 to modulate the fluid pressure level in clutch 16. The modulating means may be deemed to further comprise control chamber 26 which communicates with orifice means 35 via ports 22, groove 21 and a conduit 36. A conduit 37 which connects the upstream side of the orifice means with outlet 14 may be subjected to fluid pressures within the range of 200 to 500 psi, for example.

As an option, a cylindrical rod 38 may be loosely mounted to "float" within spring 25. The rod is normally employed in a selector valve whose associated clutch 16 required a relatively steep pressure rise during actuation thereof, i.e., modulating spool with undergo a quicker response (rightward movement) upon engagement of load piston 23 with the rod upon clutch engagement. In addition, a standard relief valve 43 is connected to the inlet conduit on the downstream side of pump 15, a plurality of radial ports 41 are preferably formed through piston 17 to provide drain passages for the chamber containing spring 25 when the rightward end of the piston abuts collar 29 and at least one radial port 42 is formed through piston 23 to provide a similar drainage function.

METHOD OF OPERATION

When selector valve 10 is conditioned to disengage clutch 16, as illustrated in the drawing, outlet 14 will communicate directly with a drain outlet 39. Furthermore, control chamber 26 communicates with drain conduit 27 whereby modulating spool 12 is urged leftwardly to its closed position by positioning spring 30. Communication of pressurized fluid from inlet 13 to outlet 14 is thus blocked-off to prevent engagement of the clutch.

Upon actuation of a conventional pilot control means 40 to communicate pressurized fluid to actuating chamber 20 via conduit 18, selector piston 17 will move rightwardly against stop means 29. Groove 21 will thus move out of communication with drain conduit 27, but will remain in communication with conduit 36. Simultaneously therewith, load piston 23 will move rightwardly to permit spring 25 to overcome the opposed biasing force of spring 30 to move modulating spool 12 rightwardly to close-off drain outlet 39. The modulating spool will simultaneously move to an open position to communicate inlet 13 with outlet 14 to initiate filling of the actuating chamber (not shown) of clutch 16 with hydraulic fluid.

Upon filling of the clutch to approximately 20 psi in a time interval of approximately 0.2 seconds, pressurized fluid in conduit 37 will pass through orifice means 35 and into control chamber 26 via groove 21 and ports 22. The pressurization of the control chamber will function to move load piston 23 further rightwardly (selector piston 17 remaining in contact with stop means 29) to gradually modulate rightward movement of modulating spool 12 to its open position for communicating full supply pressure (e.g., 200 psi) from inlet 13 to clutch 16.

It should be understood that springs 25 and 30 and orifice means 35 may be suitably calibrated to provide the clutch with infinite modulating characteristics. For example, it is normally desirable to have different shift characteristics (clutch fill pressure versus time of filling) for the various clutches employed in a transmission. As an example, it may provide desirable to engage a speed clutch prior to engagement of a directional clutch.

Upon disengagement of clutch 16, pilot control means 40 is actuated to exhaust actuating chamber 20 of pilot pressure. Exhausting chamber 20 will cause leftward movement of selector piston 17 whereby stop means 19 abuts housing 11, under the influence of spring 25. Drain conduit 27 will thus be placed in communication with control chamber 26 via groove 21 and ports 22. Since the drain conduit is restricted by orifice means 28, load piston 23 will move leftwardly in a controlled manner under the influence of springs 25 and 30 to slowly close-off inlet 13 and open drain outlet 39. For example, upon initial exhaust of chamber 20, clutch pressure may fall to approximately one-third that of full clutch engagement pressure (e.g., 200 psi) and then gradually reduce at a rate determined by the calibration of orifice means 28. Thus, a closely controlled modulation of clutch disengagement is achieved.

Figure 2:
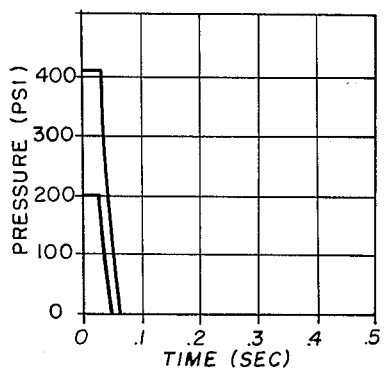
FIGS. 2-12 graphically represent pressure traces upon engagement or disengagement of a particular clutch.
Figure 3:
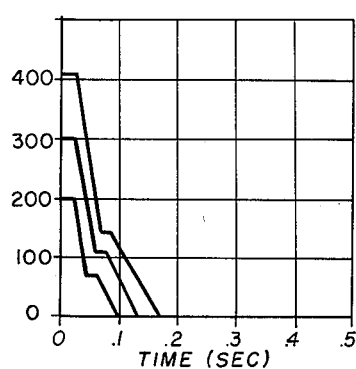
Figure 4:
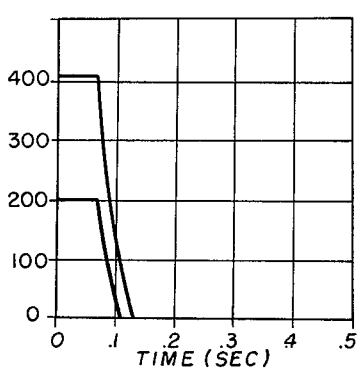
Figure 5:
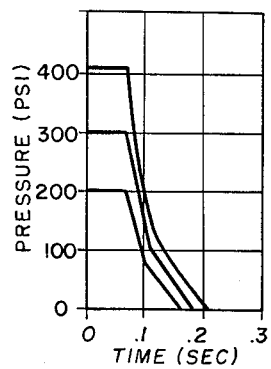
Figure 6:
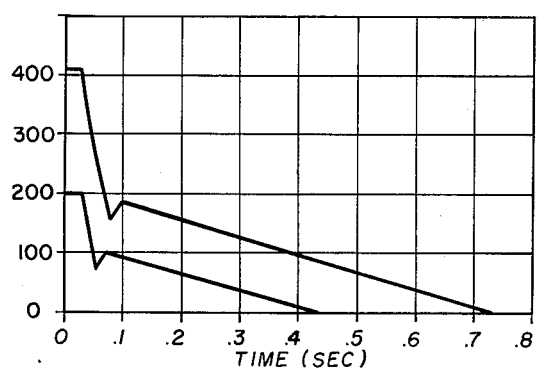

FIGS. 2-9 illustrate graphs of pressure (psi) versus time (sec.) for typical clutch disengagements. FIG. 2 illustrates disengagement of a clutch when no orifice 28 is used. Variations of clutch disengagement achieved by varying the size of orifice 28 are shown in FIG. 3 and FIG. 6.

Figure 7:
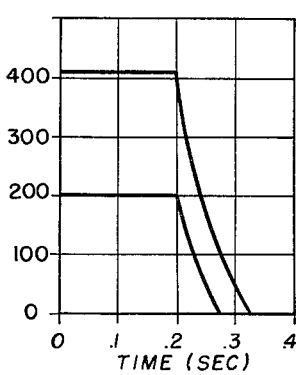
Figure 8:
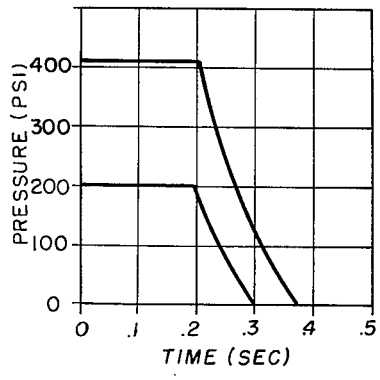
Figure 9:
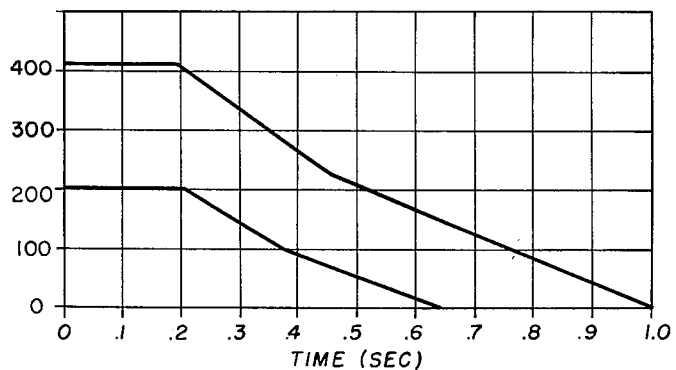

Further control of clutch disengagement can be achieved by employing an exhaust orifice (not shown) in association with pilot means 40. Effects of such an orifice are shown in FIG. 4 and FIG. 7. The results of using both orifices combined are shown in FIG. 5, FIG. 8 and FIG. 9.

Figure 10:
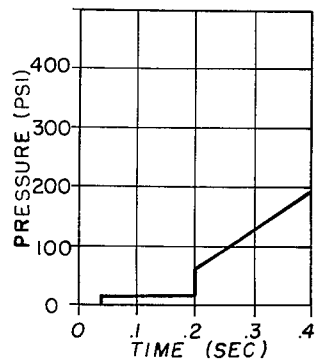
Figure 11:
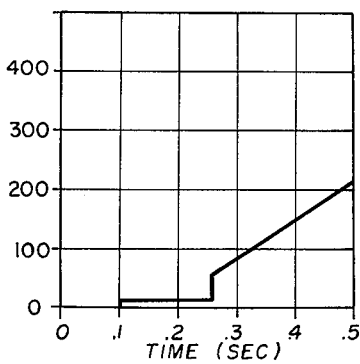
Figure 12:
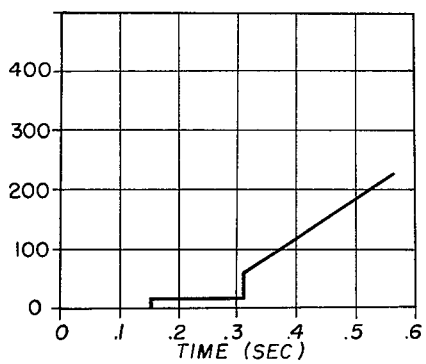

Delay of clutch engagement can be achieved by employing a supply orifice (not shown) in pilot means 40. FIG. 10 is a typical clutch engagement with no supply orifice. FIG. 11 and FIG. 12 show the effects of varying a pilot supply orifice.

Figure 13:
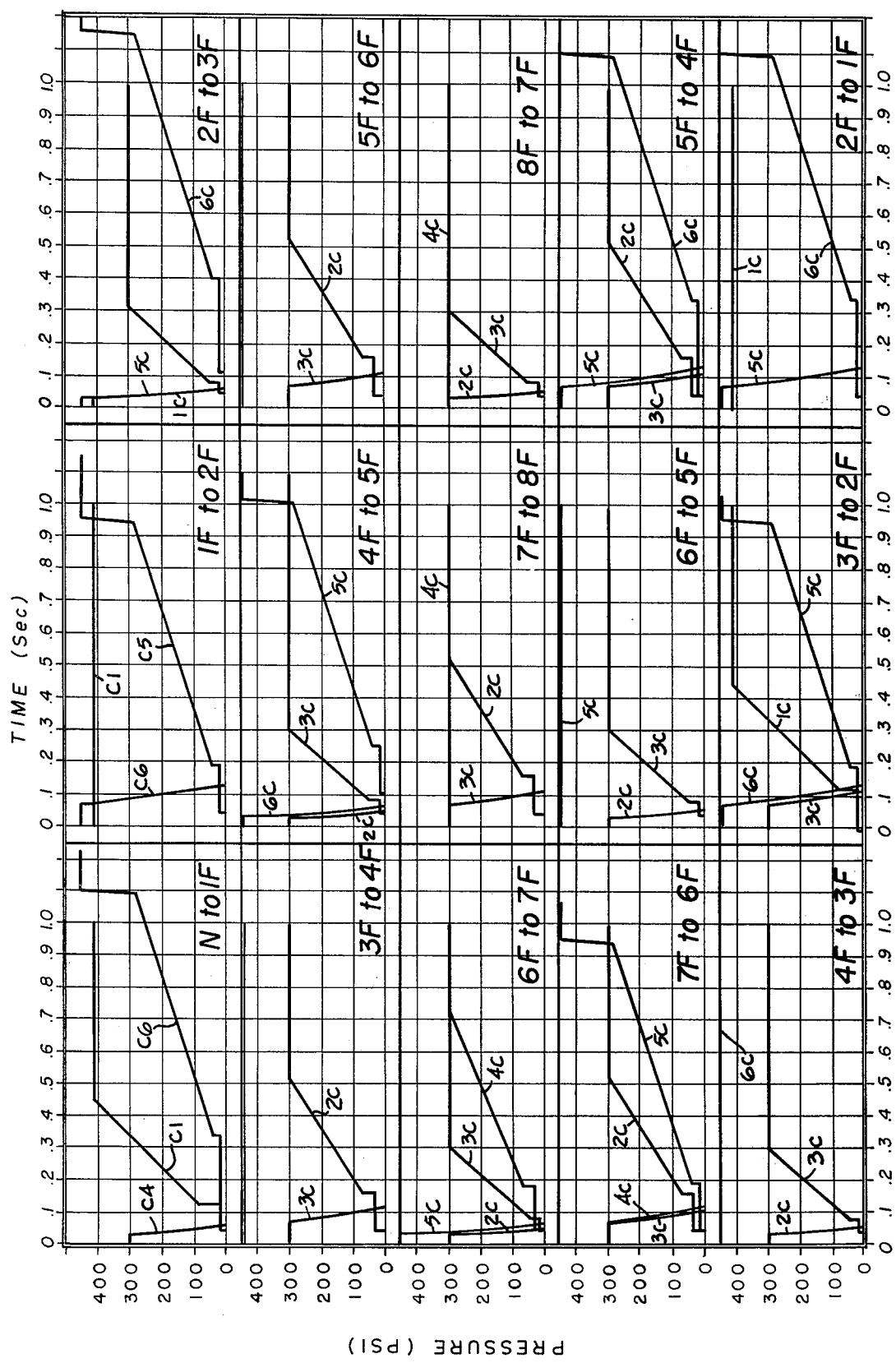
FIG. 13 graphically represents clutch pressure traces upon up-shifting and down-shifting of an eight-speed transmission.

Typical clutch pressure traces for an eight-speed transmission using a different modulating selector valve 10 for each clutch (C1 through C8) thereof are shown in FIG. 13. The traces sequentially illustrate an up-shifting from neutral (N) to first gear (1F), first gear to second gear (2F) and et. seq. and a subsequent down-shifting from eighth gear (8F) to seventh gear (7F), seventh gear to sixth gear (6F) and et. seq.

The embodiments of the invention in which an exclusive property or privilege is claimed are defined as follows:

1. A pressure modulating selector valve having an inlet, an outlet and a drain and comprising first means within said valve for movement in a first direction between a closed position blocking communication of fluid from said inlet to said outlet to an open position communicating fluid from said inlet to said outlet, said first means providing communication between said outlet and drain in the closed position and preventing communication between said outlet and drain in an open position, second means responsive to a fluid pressure pilot control signal for movement in said first direction towards said first means to a limit stop position, third means responsive to movement of said second means in said first direction for moving said first means to its open position through an interposed means to communicate said inlet with said outlet and closing said drain, and modulating means interconnected between said outlet and said third means for controlling gradual further movement of said first means through its open position in response to movement of said third means to modulate the increase of fluid pressure in said outlet to a predetermined level.

2. The pressure modulating selector valve of claim 1 wherein said first means comprises a modulating spool reciprocally mounted in a housing and positioning means for biasing said spool to a closed position, blocking communication of fluid from said inlet to said outlet.

3. The pressure modulating selector valve of claim 2 wherein said positioning means comprises a compression coil spring mounted between said spool and said housing.

4. The pressure modulating selector valve of claim 2 wherein said first-mentioned outlet communicates with said drain outlet when said spool is maintained in its closed position and wherein said spool is movable in said housing to an open position for blocking communication between said first-mentioned outlet and said drain outlet.

5. The pressure modulating selector valve of claim 2 further comprising poppet valve means mounted in said spool communicating with said outlet for dampening fluid pressures thereat.

6. The pressure modulating selector valve of claim 1 wherein said second means comprises a selector piston reciprocally mounted in a housing and wherein said third means comprises a load piston reciprocally mounted in said selector piston.

7. The pressure modulating selector valve of claim 6 wherein said interposed means further comprises modulating biasing means disposed between said load piston and said first means for aiding in modulating movements of said first means.

8. The pressure modulating selector valve of claim 6 further comprising stop means formed on said selector piston to abut said housing to define an actuating chamber adapted to receive said pilot pressure signal therein for selectively moving said selector piston towards said first means.

9. The pressure modulating selector valve of claim 8 further comprising pilot control means for selectively communicating said pilot pressure signal to said actuating chamber.

10. The pressure modulating selector valve of claim 6 further comprising stop means formed on said load piston for engaging said selector piston to define a control chamber therebetween communicating with said modulating means for receiving pressurized fluid therefrom for moving said load piston towards said first means.

11. The pressure modulating selector valve of claim 10 further comprising at least one port formed through said selector piston for communicating said control chamber with said modulating means.

12. The pressure modulating selector valve of claim 10 further comprising a drain conduit communicating with said control chamber and orifice means disposed in said drain conduit for modulating movement of said load piston away from said first means when said first means at least partially blocks communication of fluid from said inlet to said outlet.

13. The pressure modulating selector valve of claim 10 wherein said modulating means comprises orifice means for modulating fluid flow from said outlet to said control chamber.

14. The pressure modulating selector valve of claim 6 wherein said first means comprises a spool reciprocally mounted in a housing and further comprising common stop means secured to said housing for engaging an end of said spool when said spool normally blocks communication of fluid from said inlet to said outlet and for engaging said selector piston when said selector piston moves towards said spool.

15. A pressure modulating selector valve having an inlet and an outlet and comprising valve means for sequential movement in a first direction from a first position blocking communication between said inlet and said outlet, to a second position partially communicating said inlet with said outlet, and to a third position for fully communicating said inlet with said outlet, and control means for sequentially moving said valve means from its first position to its second position and for then gradually modulating movement of said valve means from its second position to its third position, said control means comprising selector piston means for moving in said first direction towards said valve means in response to a control signal to a limit stop position, load piston means for moving said valve means through an interposing means from its first position to its second position and towards said third position in response to movement of said selector piston means, and modulating means interconnected between said outlet and said load piston for controlling gradual movement of said load piston means and simultaneous gradual movement of said valve means from its second position to its third position in response to fluid pressure in said outlet.

16. The pressure modulating selector valve of claim 15 wherein said selector piston means and said load piston means move simultaneously when said valve means is moved from its first position to its second position and wherein only said load piston means moves, relative to said selector piston means, when said valve means is moved from its second position to its third position.

* * * * *